3,137,716
METHOD OF PRODUCING ARSENIC AND
ANTIMONY ALKYLS
Walter A. Stamm, Dobbs Ferry, and Arthur W. Breindel, Yonkers, N.Y., assignors to Stauffer Chemical Company, New York, N.Y., a corporation of Delaware
No Drawing. Filed Nov. 16, 1961, Ser. No. 152,917
4 Claims. (Cl. 260—440)

This invention pertains to a method of producing alkyls of certain heavy metals belonging to Group V of the periodic table. More particularly, the invention relates to the alkylation of the oxides and sulfides of arsenic and antimony, using an alkylated aluminum as the alkylating agent.

The alkyl derivatives of arsenic and antimony are known compounds and their description can be found in the technical literature. For instance, British Patent 768,765 discloses the alkylation of arsenic and antimony fluorides by means of triethylaluminum etherate. A similar type of reaction is described in German patent specification 1,064,-513 which proposes the alkylation of certain heavy metal halides such as arsenic trichloride by means of a trialkylaluminum alkylating agent in the presence of sodium chloride. It is, of course, also well known that arsenic and antimony alkyls can be obtained by the reaction of their halides with Grignard reagents.

In examining the aforedescribed procedures, it is to be noted that they share one common feature, to wit, the heavy metal must be utilized in the form of its halides, i.e., fluorides or chlorides. The use of such intermediates is disadvantageous both from a cost factor and from the standpoint of convenience. Thus, whereas the oxides and halides of arsenic and antimony are approximately equal in cost on a per unit weight basis, when the comparison is based on the metal content of these materials, it is obvious that the oxides are much lower in cost due to their higher metal content. Moreover, the heavy metal halides are extremely corrosive, requiring special care in handling and transporting. When the heavy metal halides are employed in chemical reactions, highly corrosive and poisonous hydrohalic acids are formed as by-products and this constitutes another undesirable feature of the aforesaid starting materials. Since heavy metal alkyls are achieving increasing importance in the pharmaceutical and agricultural fields, the art is manifestly in need of a method for producing these useful and valuable heavy metal derivatives on an industrial scale.

A method has now been discovered whereby arsenic and antimony alkyls can be produced which eliminates the need for metal halides and the disadvantages attendant to the use thereof and it is the provision of such a method which constitutes the primary purpose and object of this invention. Other objects and purposes will become manifest as the description proceeds.

The present invention is predicated on the discovery that the oxides and sulfides of arsenic and antimony can be alkylated directly by the use of an alkylated aluminum as the alkylating agent. The course of the reaction is depicted formalistically by the following equation:

$$2Al(R)_3 + M_2Z_3 \rightarrow Al_2Z_3 + 2M(R)_3$$

wherein R is an alkyl group from 1 to 12 carbon atoms, M represents arsenic or antimony and Z signifies oxygen or sulfur. The alkylated aluminum derivatives which are known entities include the aluminum trialkyls, i.e., trimethylaluminum, triethylaluminum, tri-n-propylaluminum, triisobutylaluminum, tri-n-butylaluminum, tri-n-amylaluminum, triisoamylaluminum, tri-n-hexylaluminum, triisoheptylaluminum, triisooctylaluminum, tri-n-decylaluminum, tri-n-dodecylaluminum and the like; other alkylated aluminums are the alkyl aluminum halides such as dialkylaluminum chlorides and the alkylaluminum dichlorides.

Since the heavy metal sulfides and oxides, which are the starting materials for the processes of this invention, are inexpensive and readily accessible sources of arsenic and antimony, the alkylation of these materials can be effected at a substantial reduction in operating costs and our process is, in fact, eminently suitable for operation on a commercial basis. Although the sulfides and oxides of arsenic and antimony are manufactured synthetically, these heavy metal derivatives occur naturally and are mined on an extensive scale. We have experimented with the aforementioned naturally occurring heavy metal sulfides and oxides and find that they can be alkylated in the same manner as the synthetically produced materials and this feature constitutes a further advantage of the process of the invention. Examples of naturally occurring arsenic oxides include arsenolite and claudetite, a native arsenic trioxide, whereas antimony trioxide occurs as the minerals senarmontite and valentinite; sulfides of arsenic and antimony are also well known and, in this connection, reference is made to the minerals stibnite, an antimony trisulfide and orpiment, an arsenic trisulfide. Such natural occurring heavy metal sulfides can be used in place of the synthetic sulfides in carrying out the method of the invention.

In preparing the arsenic and antimony alkyls it has been our finding that excellent results are obtained by refluxing a suspension of the finely divided heavy metal sulfide or oxide with an excess of the aluminum trialkyl in the persence of a relatively inert solvent, having a boiling point below the decomposition of the aluminum trialkyl. The thermal decomposition of the aluminum trialkyls occurs in the neighborhood of 100° C. and it is therefore recommended that the alkylation reaction be carried out below this temperature and, in this connection, a range of about 30° C. to 100° C. has been found to give excellent results.

Generally, the aluminum alkylating agent is added to a slurry of the heavy metal oxide or sulfide and the resultant mixture refluxed to complete the reaction, after which the heavy metal alkyl is isolated by distillation. Although, as above pointed out, the alkylation proceeds smoothly in the absence of a solvent, in the event a solvent is desired, the saturated aliphatic hydrocarbons including their chlorinated derivatives are especially suitable, the preferred members being pentane, hexane and heptane.

The aluminum alkylating agents as used in practicing the invention are known chemical entities and are disclosed in the technical literature. Generally, such compounds are obtained by reacting an olefinic hydrocarbon with activated aluminum in the presence of hydrogen; details of this reaction are given in Annalen der Chemie 589, 91 (1954). It is to be noted that one of the products of the reaction of aluminum trialkyls with the heavy metal oxides is aluminum oxide, a valuable and important industrial chemical. Manifestly, the formation of aluminum oxide as a by-product constitutes a further and distinctive advantage of the process of this invention.

Reference is now made to the following examples which are presented for the purpose of illustration only and it is to be understood that variations in producing the invention without departing from the scope or spirit thereof, will be apparent to those skilled in the art to which the said invention pertains.

EXAMPLE 1

*Triethylarsenic*

A three-necked reaction vessel equipped with stirrer, reflux condenser and dropping funnel was charged with 58.7 parts of anhydrous arsenic trioxide and 150 parts of hexane. Upon contacting the agitated slurry with 114 parts of triethylaluminum an exothermic reaction started; reflux temperature was maintained for 2 hours, after which the arsenic trioxide had dissolved. The solvent was then stripped and 82 parts (85% of theory) of a colorless liquid, B.P. 84–85° C. at 145 mm. was distilled. This was identified as triethyl arsenic.

EXAMPLE 2

*Triisobutylantimony*

In the absence of a solvent, 37.8 parts of anhydrous antimony trioxide was contacted with 85 parts of triisobutylaluminum in a three-necked reaction flask equipped with stirrer, dropping funnel and thermometer. The reaction temperature was maintained at 70° C. for 2 hours. On distillation, 58 parts (80% of theory) of a colorless liquid, B.P. 45–46° C. at 0.08 mm. was obtained. This was identified as triisobutylantimony.

EXAMPLE 3

*Triisobutylantimony*

Anhydrous antimony trioxide (44 parts) dispersed in 150 parts of hexane was contacted with 110 parts of triisobutylaluminum under conditions identical to those of Example 1. On distilling the product, 67 parts (80% of theory) of a colorless liquid, B.P. 45–46° C. at 0.08 mm. was obtained. This was identified as triisobutylantimony.

EXAMPLE 4

*Triisobutylarsenic*

Anhydrous arsenic trioxide (147 parts) and 500 parts of hexane were contacted with 500 parts of triisobutylaluminum under conditions identical to those of Example 1. On distillation, 120 parts (33% of theory) of a colorless liquid, B.P. 41–42° C. at 0.3 mm. was obtained. This product was identified as triisobutylarsenic.

EXAMPLE 5

*Triisohexylantimony*

Anhydrous antimony trioxide (43.7 parts) in 150 parts of hexane was contacted with 164 parts of triisohexylaluminum under conditions identical to those of Example 1. On distillation 25 parts (24% of theory) of a colorless liquid, B.P. 80–82° C. at 0.04 mm., was obtained. This was identified as triisohexylantimony.

EXAMPLE 6

*Triisobutylantimony*

Six parts of anhydrous antimonytrisulfide was contacted with 48 parts of triisobutylaluminum under conditions identical to those of Example 2. On distillation, 3 parts (25% of theory) of a colorless liquid, B.P. 45–46° C. at 0.08 mm., was obtained. This was identified as triisobutylantimony.

EXAMPLE 7

*Triethylarsenic*

In the absence of solvent, 39.6 parts of anhydrous arsenictrioxide was contacted with 122.5 parts of diethylaluminum chloride under conditions identical to those of Example 2. On distillation, 26 parts (40% of theory) of a colorless liquid, B.P. 84–85° C. at 145 mm., was obtained. This was identified as triethylarsenic.

We claim:

1. A method of producing a heavy metal alkyl of the formula:

$$M(R)_3$$

wherein M is selected from the class consisting of arsenic and antimony and R designates an alkyl group of from 1 to 12 carbon atoms which comprises reacting a heavy metal derivative of the formula $M_2(Z)_3$ wherein M has a value as above designated and Z is selected from the class consisting of oxygen and sulfur with an alkylated aluminum selected from the class consisting of aluminum trialkyl, dialkyl aluminum chloride and alkyl aluminum dichloride, each alkyl group containing from 1 to 12 carbon atoms, said reaction being carried out below the thermal decomposition point of the alkylated aluminum and isolating the so-obtained heavy metal alkyl.

2. A method according to claim 1 wherein the reaction is carried out by refluxing in a saturated hydrocarbon solvent, having a boiling point below the thermal decomposition of the alkylated aluminum.

3. A method according to claim 1 wherein the alkylated aluminum is aluminum trialkyl, each alkyl group having from 1 to 12 carbon atoms.

4. A method according to claim 2 wherein the saturated aliphatic hydrocarbon is hexane.

References Cited in the file of this patent
UNITED STATES PATENTS
2,859,225        Blitzer et al. ------------ Nov. 4, 1958